Oct. 14, 1958 I. M. ROSS 2,856,544
SEMICONDUCTIVE PULSE TRANSLATOR
Filed April 18, 1956 3 Sheets-Sheet 1
FIG. 1
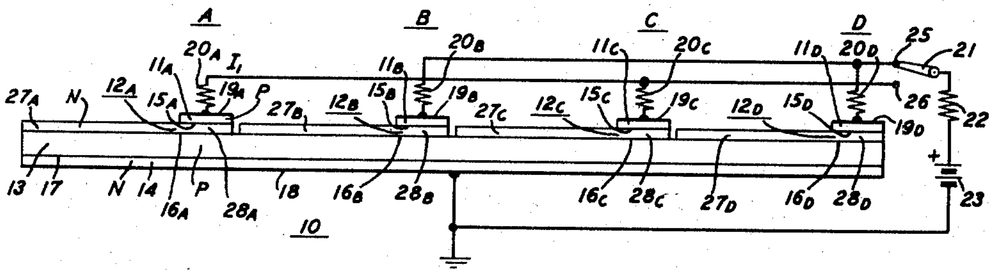
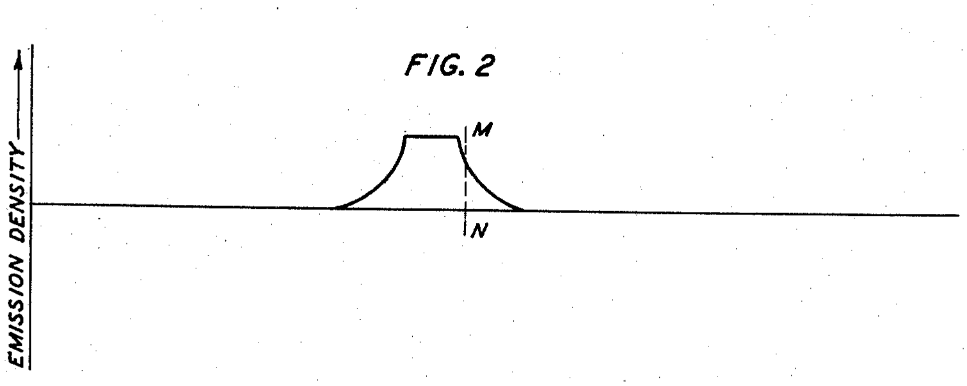
FIG. 3
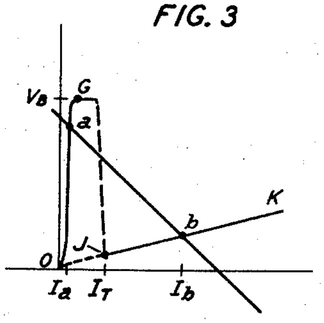
FIG. 4
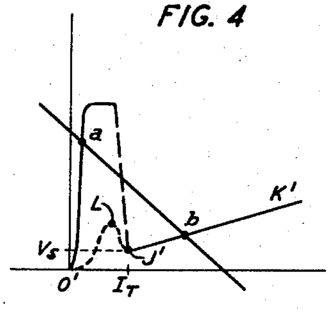
INVENTOR
I. M. ROSS
BY [signature]
ATTORNEY FIG. 5
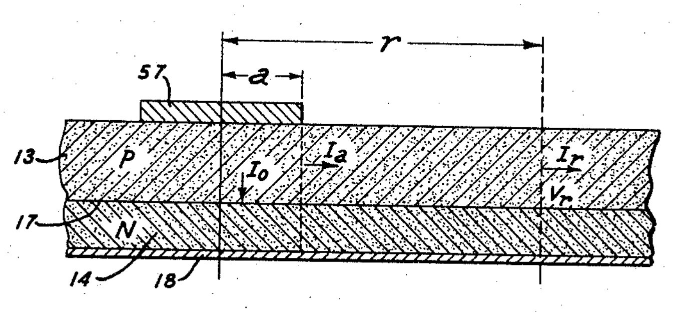
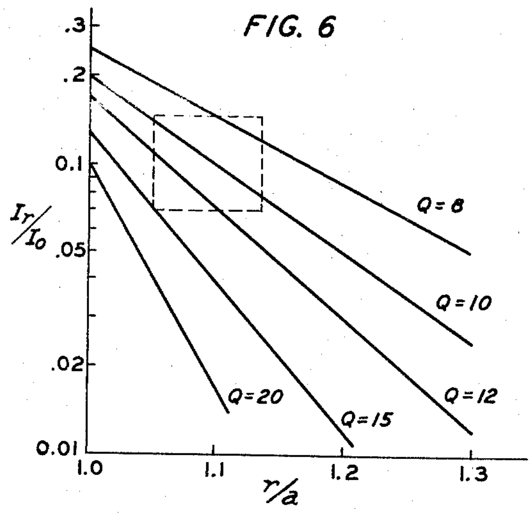
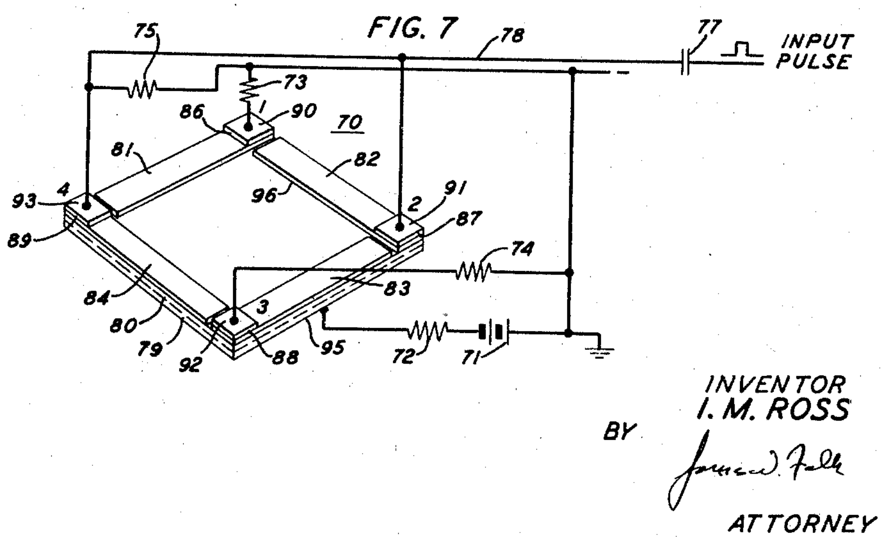
INVENTOR
I. M. ROSS
BY
[signature]
ATTORNEY

SEMICONDUCTIVE PULSE TRANSLATOR

INVENTOR
I. M. ROSS
BY [signature]
ATTORNEY

United States Patent Office 2,856,544
Patented Oct. 14, 1958

2,856,544

SEMICONDUCTIVE PULSE TRANSLATOR

Ian M. Ross, New Providence, N. J., assignor to Bell Telephone Laboratories, Incorporated, New York, N. Y., a corporation of New York Application April 18, 1956, Serial No. 579,006

8 Claims. (Cl. 307—88.5)

This invention relates to pulse translators and more particularly to semiconductive devices and cooperating circuit arrangements suitable for data processing of the general type disclosed in my copending application Serial No. 516,521 of June 20, 1955, entitled "Semiconductive Pulse Translator."

Semiconductive translators including an array of sections which can be individually and successively placed in a conducting condition by the application of suitable signals and which offers many of the functions of gas stepping tubes, including those of counting, coding, and decoding, are disclosed in the above application together with some actuating and utilization circuits. Those translators each include a semiconductive body containing a plurality of zones of different conductivity types, one of the zones being common to all conducting or stepping sections and the remaining zones being critically arranged with respect to each other. Some of the disclosed translators required the alignment of discrete zones on opposite faces of a common zone, a plurality of connections to the common zone, often critically positioned with respect to each switching section, and individual connections to the discrete opposed zones. Thus, the semiconductive structures and the completed translators are somewhat complex and difficult to fabricate.

An object of this invention is to simplify and improve semiconductive translators and utilization circuits of the above type. Additional objects include facilitating the fabrication of semiconductive stepping devices, increasing the ratio of the on to the off impedance of the individual stepping sections in such devices, and enabling the pulse translating functions to be realized at higher frequencies.

One embodiment of the invention fulfilling the above objects is a translator having a semiconductive body including a first and second contiguous zone of opposite conductivity type common to a plurality of stepping sections therein. A single connection is made to the first zone. An array of separate zones of semiconductive material of the conductivity type opposite that of the second zone engages it, and a fourth zone is positioned on only a portion of each separate zone so that each four zone sandwich forms a four zone stepping section. These four zone stepping sections offer a large ratio of high to low impedance by virtue of a change in the current multiplication of the sections as a function of the charge carrier density in the two intermediate zones. Positive transfer of conduction between adjacent sections is insured by arranging the common intermediate zone so that the charge carrier density therein within the nonconducting section adjacent the conducting section is greater than within any other nonconducting section. This primes the next section so that its current multiplication is higher than the other nonconducting sections and therefore conducts in preference to the other sections upon the application of a suitable signal.

One feature of this invention involves a semiconductive structure having a relatively large area p–n junction which may be placed in a state of high conductivity over only a controlled restricted portion of its surface.

Another feature resides in utilizing a plurality of control elements in combination with a semiconductive body containing a large area p–n junction whereby the restricted highly conducting portion of the junction can be shifted in position over the junction. In particular, the large area junction may function as an emitter of minority charge carriers which, in cooperation with a plurality of collectors of the charge carriers, can be made ineffective as an emitter in the vicinity of certain of said collectors while emitting charge carriers in the vicinity of certain other of the collectors.

An additional feature resides in utilizing a restricted conducting portion of a large area p–n junction as a localized emitter of minority charge carriers into a semiconductive body zone engaged by a plurality of p–n junction collectors, each arranged to have a preferred portion for collection and a transfer portion adjacent a preferred portion. The application of appropriate signals to the collectors concentrates the emission opposite a preferred portion of one collector and advances that emission first to a portion of the large area junction opposite the transfer portion of the next adjacent collector and then to a portion opposite the preferred portion of that next adjacent collector.

A further feature utilizes a semiconductive translator geometry which enables more rapid switching of a conductive path whereby signals may be applied at megacycle rates. This geometry includes the reduction of the complexity of the structure to one including two zones common to all stepping sections and but one contact to those two zones and common to all stepping sections.

Another feature resides in a stepping circuit wherein the stepping or input signals and the output signals are both arranged to appear relative to ground.

Another feature resides in combining in a translator of this invention a plurality of stepping sections in an array offering alternative current paths whereby a selected output of a plurality of outputs can be energized. A subsidiary feature of this combination involves arranging signal means to convert pulse trains into first and second pulse inputs, pulses of which represent the presence and absence, respectively, of pulses in the original train. When each of these two pulse inputs is connected to one of two alternative paths in the array, the pulse train is decoded by virtue of the energization of the output representing that code.

The above and other objects and features will be more fully understood from the following detailed description when read with reference to the accompanying drawings, in which:

Fig. 1 is an elevation of an aligned array of stepping sections in one form of translator according to this invention, in combination with a schematic of one form of actuating and utilization circuit;

Fig. 2 shows the density of emission of charge carriers across the rectifying barrier of the device of Fig. 1 which is coextensive with the array of stepping sections of that device plotted against distance along that barrier;

Figs. 3 and 4 are plots of voltage against current for individual stepping characteristics of these sections;

Fig. 5 is a sectioned elevation of a portion of a stepping section embodying certain simplifying assumptions for purposes of explaining the emission concentration mechanism of this invention;

Fig. 6 shows the ratio of radial current, $I_r$, to total current in the contact, $I_0$, in the structure of Fig. 5, plotted against the ratio of the radial distance from the center of the contact, $r$, to the diameter of that contact, $a$;

Fig. 7 is a perspective of a translator having an array of stepping sections which is closed upon itself, the translator being connected to a schematic circuit wherein all inputs and outputs are with respect to ground.

Figure 8:
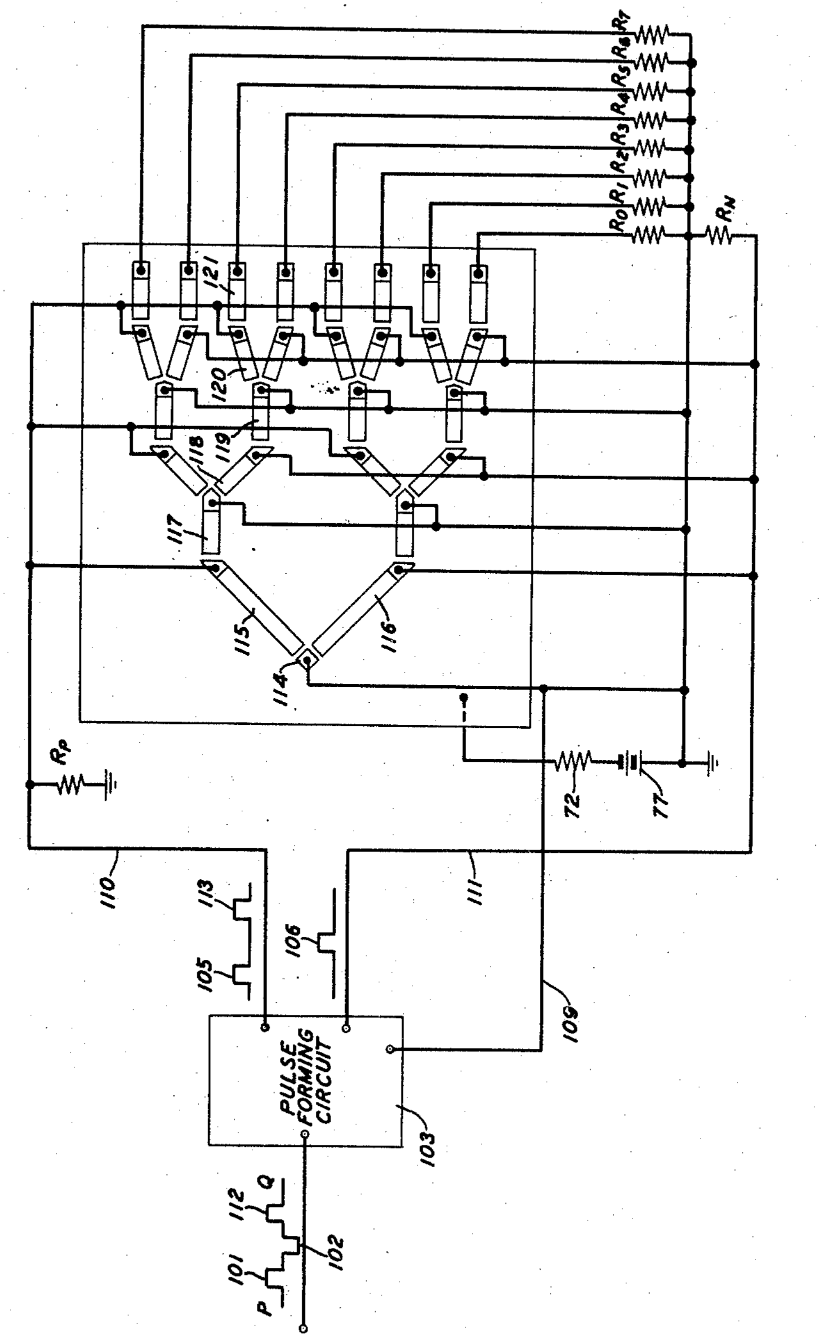
Fig. 8 illustrates one form of decoder according to this invention.

Referring now to the drawings, a semiconductive translator 10, functioning as a four sectioned stepping device, is shown in Fig. 1. This translator comprises a body of semiconductive material such as silicon, germanium, or silicon-germanium alloys containing stepping sections A, B, C, and D. Each section includes four contiguous zones 11, 12, 13, and 14, of alternately opposite conductivity type which have been shown as a p-n-p-n structure, although it is to be understood that with an appropriate reversal of polarities in the associated circuitry an n-p-n-p configuration can be employed. Zones 11 and 12, n-p junction 15 therebetween, n-p junction 16 between zones 12 and 13, and contact 19 to zone 11, are individual to each stepping section and function in the same manner in each section; therefore, those elements have been identified with subscripts corresponding to their section designations. Zones 13 and 14, n-p junction 17 therebetween, and the broad area conductive contact 18 to zone 14, are common to all stepping sections.

In operation each section offers a bistable characteristic as shown in Figs. 3 and 4, resulting from a mechanism as set forth in W. Shockley application Serial No. 548,330 of November 22, 1955, entitled "Semiconductive Switch." This characteristic in a four zone semiconductive element such as the p-n-p-n structure composed of $\mathbf{11}_A$, $\mathbf{12}_A$, 13, and 14 is attributable to a change in the current multiplication in one or both of the intermediate zones $\mathbf{12}_A$ and/or 13 as a function of current through the unit from a low value offering a high impedance characteristic OG in Fig. 3 at low currents to a high value and low impedance, operation along JK at high currents. One explanation of this phenomenon is that the intermediate zones contain charge carrier recombination centers which are unoccupied at low currents and can be at least partially occupied at high currents. Thus, below some critical density of charge carriers in those zones a major portion of the charge carriers entering the zones lodge in the centers and fail to traverse the zone to the reverse biased rectifying junction $\mathbf{16}_A$. In view of the absence of charge carriers to modify the impedance of the junction, the element exhibits its reverse impedance and passes approximately the saturation current of the junction until a potential exceeding the breakdown potential is imposed across it. At higher charge densities in the intermediate zones of the element a greater portion of the recombination centers are occupied and a large proportion of any injected charge increment is collected at the reverse biased junction. A number of means are available for increasing the charge density in the intermediate zones to the saturation level including exceeding the breakdown potential on the reverse biased junction, exciting carriers with light or heat at that junction or in other portions of the semiconductor, or injecting sufficient carriers into the zones from some outside source. This last technique can be advantageously employed in the present device to effect the positive transfer of a conduction path from one section to the next succeeding section in the array.

Consider, for example, a device fabricated from silicon; four zone silicon devices exhibit this change in current multiplication, $\alpha$, with current presumably due to the presence of saturable recombination centers in the intermediate zones. These centers can be introduced by the addition of iron to the silicon, nickel in germanium, or the introduction of dislocations into essentially any semiconductor as by bombardment with high or intermediate energy particles (particles having energies in excess of a few hundred thousand electron volts). A silicon structure of this nature can be fabricated by diffusion techniques so that resistivity and thickness of the four zones are such that the outermost zones 11 and 14 are good emitters of minority carriers into their respective contiguous intermediate zones 12 and 13 and zones 12 and 13 offer a minority charge carrier transport factor, $\beta$, which is an appreciable fraction of unity when the charge carrier density therein is sufficient to fill a portion of the recombination centers present.

A device as shown in Fig. 1 offering an alpha which is a function of current and having its section B connected to a circuit including a load $\mathbf{20}_B$ through a switch 21, a common resistor 22, and a source of potential 23 can be placed in a low impedance or conducting state as shown at *b* in Fig. 3. Source 23 is poled to forward bias the two outer junctions $\mathbf{15}_B$ and 17 and reverse bias inner junction $\mathbf{16}_B$ by biasing contact $\mathbf{19}_B$ positive with respect to contact 18. The load line of Fig. 3 is determined by the magnitudes of load $\mathbf{20}_B$, resistor 22, and source 23. Alternatively, this section might be in its high impedance state at *a* of Fig. 3 with the same connections. For purposes of discussing the transfer mechanism between switching sections, let us for the moment disregard the mechanism and means of placing the element in its conducting state and consider the effect of that state.

Zone 13 has appreciable lateral resistance (of the order of 100 ohms/square) so that the emission of electrons across junction 17 will be concentrated under junction $\mathbf{15}_B$ so that the density of electron emission along junction 17 will be of the form shown in Fig. 2. When the betas (minority carrier transport factors) in zones $\mathbf{12}_B$ and 13 are of the same order of magnitude, an appreciable fraction of the total current that crosses reverse biased junction $\mathbf{16}_B$ is carried by holes. This hole current is emitted over junction $\mathbf{15}_B$ and diffuses across zone $\mathbf{12}_B$ so that it is concentrated at junction $\mathbf{16}_B$ over an area generally corresponding to an extension of junction $\mathbf{15}_B$. Junction $\mathbf{16}_B$ has a lateral extent corresponding to that of junction $\mathbf{15}_B$ with the exception of the extension of zone $\mathbf{12}_B$ to the left of that junction. The diffusion to the left in zone $\mathbf{12}_B$ is negligible since the lateral dimensions of junction $\mathbf{15}_B$ are large compared to a minority carrier (hole) diffusion length in zone $\mathbf{12}_B$. Since there is no electrical contact to zone 13, a current of the same magnitude as the hole current $I_p$, which enters that zone across junction $\mathbf{16}_B$, must cross junction 17. The lateral resistance of zone 13 causes any sideways flow of holes therein to produce an IR drop which decreases the forward bias across junction 17. The forward bias on junction 17 is therefore an inverse function of the distance from a projection of junction $\mathbf{15}_B$ through the body of translator 10. Electrons are drawn across the junction 17 in densities corresponding to the forward bias thereon and thus with a distribtuion as shown in Fig. 2. The degree of concentration of electron emission from junction 17 depends upon the resistivity of the zone 13 and the total current flowing through the device.

The conductive path through translator 10 can be switched from section B to section C by transferring switch 21 from contact 25 which is connected to sections B and D to contact 26 connected to sections A and C. If this switching action is rapid, for example a switching interval less than an electron lifetime in zone 13 and short compared to the transit time of electrons across that zone, the electron density in zone 13 will have a distribution corresponding in general to the emission distribution of Fig. 2 when a potential is applied to section C. Each zone 12 and its associated junction 16 has been extended laterally beyond junction 15 so that it is spaced from and closely adjacent the portion of zone 12 and junction 16 immediately under the junction 15 of its next preceding section in the array. Thus, considering the portion under junction 15 as the preferred conduction path for each section, the extension of each section beyond that preferred path can be considered a starter region. When the potential of source 23 is transferred from sections B and D to sections A and C, emission from junction $\mathbf{15}_B$ and the portion of junction $\mathbf{17}_B$ beneath $\mathbf{15}_B$ ceases. The emitter junctions 17 and 15 of sections A and C tend to conduct. If the applied potential is insufficient to break down junction 16 of these sections, less than $V_B$ of Fig. 3, then ordinarily the entire device remains in a high impedance state. However, with the persistence of charge carriers in zone 13, with the density distribution shown in Fig. 2, section C is primed to conduct without breaking down junction $\mathbf{16}_C$ by virtue of the electrons emitted under the starter portion of $\mathbf{16}_C$ during the conduction of section B. These electrons are represented by the curve to the left of MN in Fig. 2. Since there is essentially zero emission of electrons across junction 17 in the vicinity of sections A and D, the V–I characteristics for these contacts will be as shown in Fig. 3. Thus, the connection of source 23 to section A will not trigger it to its low impedance state. Those charge carriers in the starter portion of section C are sufficient to cause that section to enter its low impedance state and conduct. Considered as an idealized device section, C operates along the low impedance plot OJK as shown in Fig. 3; in practice however, the sections often follow the characteristic O'J'K' of Fig. 4 wherein a voltage peak as shown at L must be exceeded in applying the source to a primed section in order to bring it into its low impedance state.

It will be convenient to describe the rectifying junction $\mathbf{15}_B$ as being opposite the rectifying junction $\mathbf{16}_B$ and substantially opposite the rectifying junction $\mathbf{16}_C$. On the other hand, rectifying junctions $\mathbf{16}_A$ and $\mathbf{16}_D$ which are too far removed from rectifying junction $\mathbf{15}_B$ to be affected significantly by the flow of carriers across it will be considered as being neither opposite nor substantially opposite to it.

The priming action can be explained in accordance with the theory proposed by Shockley for four zone devices as a partial filling of the recombination centers between a portion of collector junction $\mathbf{16}_C$ and the region of junction 17 which lies thereunder by the electrons persisting in zone 13, coupled with the attraction of some of those electrons to junction $\mathbf{16}_C$ to increase its reverse current. Since this priming action occurs within only a limited range of the preferred conduction path, it combines the features of priming the next adjacent section with that of locking out all other sections connected in parallel therewith. One criterion for transfer of the conduction path from section to section is the proximity of the primed portion of a section to the conducting path of a preceding section. For example, the lateral position of the conduction transfer or starter region 27 of zone $\mathbf{15}_C$ with respect to its preferred conducting region 28 of its next preceding section in the array on zone 13 should be as close as fabrication techniques will permit. Assurance that conduction will be transferred to a particular path is obtained by separating all portions of other sections in parallel with the primed section from the conducting path an amount sufficient to avoid interaction within the translator. In particular, the separation of those other sections from the conducting path should be large compared to the lateral extension of carrier emission from junction 17 beyond an extension of junction 15 of the conducting path (see, for example, Fig. 2). The dimensions for a particular array of conducting sections and their orientation with respect to each other can be calculated as illustrated in the particular example set forth below.

Once the low impedance state is established across a portion of junction $\mathbf{16}_C$ it continues so long as the source supplies sufficient current. Since the impedance of section C is also a function of the holes diffusing from junction $\mathbf{15}_C$ through zone $\mathbf{12}_C$ and the density of holes distributed over junction $\mathbf{16}_C$ is greater beneath junction $\mathbf{15}_C$ than over the remainder of the zone, the initiation of a low impedance condition in the starter portion of section C, including region $\mathbf{27}_C$, induces a flow of holes from junction $\mathbf{15}_C$ which reduces the impedance of that portion of section C, including region $\mathbf{28}_C$, immediately thereunder to a lower value than the remainder of the section. Current flow therefore advances along junction 17 to the preferred path of conduction beneath junction $\mathbf{15}_C$ and concentrates in that area due to the more favorable forward bias in that portion of junction 17 in that path and thus the greater supply of minority charge carriers on each side of junction $\mathbf{16}_C$ in that path.

When section C attains its stable state, it produces the same form of emission pattern from junction 17 as shown for section B, thereby introducing electrons into the starter portions of region 13 and junction $\mathbf{16}_D$ of section D. This primes D so that the transfer of switch 21 to contact 25 causes conduction to be transferred to D in accordance with the above cycle while section B and any others connected to contact 25 and sufficiently remote from the preferred conducting path of section C are locked out.

The qualitatively defined parameters for a stepping structure have been discussed and an operative embodiment of this invention will be disclosed. However, the following discussion is presented as an aid in the design of stepping regions of the proper physical dimensions for general application in a structure wherein the zones 13 and 14 are semi-infinite in extent relative to zones 11 and 12. It is to be understood that a linear geometry places far less stringent design requirements upon the structure and enables transfer of conduction to be realized with a wider degree of design latitude. Such a geometry is attained by restricting zone 13 to a continuous band coextensive with the array of conduction paths. This advantage of the linear geometry resides in the reduction of emission concentration at junction 17 to essentially the linear dimension.

As discussed previously the emission concentration effect results from the flow of a hole current, $I_p$ in the *p* zone 13 of Fig. 1. It is reasonable to assume that the current $I_p$ crosses the junction 16 uniformly over the area within radius *a*, corresponding to a projection of junction 15 to the face of zone 13, and that no current crosses the junction for a radius greater than *a*. This hole current will then flow out radially and recombine with a fraction $\beta$ of the electrons emitted across junction 17. Hence, a complete solution of the emission concentration effect would involve the $\beta$ in zone 13 and, since beta is known to be a function of the current flow in zone 13, the solution would be complicated. However, since $\beta$ is assumed to be a sensible fraction of unity in both middle zones 12 and 13, a reasonable solution to the problem can be obtained if we assume that the current across junction 16 is totally carried by holes, that is, $I_p=I$. The problem then reduces to that of an infinite p-n junction 17, the n-type zone 14 being an equipotential, the p-type zone 13 having a sensible resistivity, and a circular ohmic contact 57 of radius *a*, made to the p-type region. This structure is shown in Fig. 5.

Assume that the resistivity of the p-type material is $\rho$ ohms per square, that at radius *r* the potential across the junction in the forward direction is $V_r$, and that the total radial current in the p-type material is $I_r$. Taking $I_s$ to be the saturation current per square centimeter of the p-n junction we can now put down the two equations relating $I_r$, $V_r$, and I.

$$\delta I_r/\delta r=-2\pi I_s r(e^{bV_r}-1) \quad (1)$$

where $$b=q/KT$$

and $$\delta V_r/\delta r=-\rho I_r/2\pi r \quad (2)$$

A complete solution to these equations is not possible. However, a practical solution can be obtained by assuming that in Equation 2 $I_r$ is constant at $I_a$, solving Equation 2 for the distribution of V, and using this result to solve Equation 1. Hence, if $$\delta V_r/\delta r=-\rho I_a/2\pi r$$

then $$V_r=V_a-[\rho I_a/2\pi] \log r/a \quad (3)$$

where $$V_r = V_a \text{ for } r = a$$

Substituting for $V_r$ into Equation 1 gives $$\delta I_r/\delta r = -2\pi I_s\left[r\left(\frac{a}{r}\right)^Q e^{bV_a} - r\right]$$

where $$Q \equiv b\rho I_a/2\pi$$

Integrating leads to $$I_r/2\pi I_s = -\frac{e^{bV_a}}{2-Q}\cdot r^2\left(\frac{a}{r}\right)^Q + \frac{r^2}{2} + C_1 \quad (4)$$

where $C_1$ is a constant of integration. A simple solution to Equation 4 can be obtained if $Q>>1$. In a typical case of interest $\rho \doteq 1000\Omega/\text{cm.}^2$ and $I_a$ is of the order of 10 milliamperes. Thus, taking $b$ as 40 we obtain $Q \doteq 60$.

If $Q>>1$, Equation 4 may be simplified to $$I_r/2\pi I_s = \frac{e^{bV_a}}{Q}\cdot r^2\cdot\left(\frac{a}{r}\right)^Q + \frac{r^2}{2} + C_1$$

To evaluate $C_1$, take the boundary condition $I_r=0$ at $V_r=0$. Then from Equation 3

$$I_r = 0 \text{ and } V_r = 0 \text{ at } r = ae^{bV_a/Q}$$

Substituting into Equation 4 to evaluate $C_1$ gives $$I_r/2\pi I_s \frac{e^{bV_a}}{Q}\cdot r^2\left(\frac{a}{r}\right)^Q + \frac{r_2}{2} - \frac{a^2}{2}e^{2bV_a/Q} \quad (5)$$

Using the fact that $I_r=I_a$ when $r=a$ we can use Equation 5 to obtain a value for $V_a$. Hence $$e^{bV_a} = \frac{Q}{2\pi a^2}\cdot\frac{I_a}{I_s} \quad (6)$$

Substituting this value into Equation 5 results in $$I_r/I_a = \left(\frac{a}{r}\right)^{Q-2} \quad (7)$$

Equation 7 determines the distribution of lateral current in the p-type material. The total current flowing through the contact of radius $a$ is equal to $I_a$ plus a current $I_0$ that flows directly to the junction. If the resistance across the p-type zone is small then $$I_0 = \pi a^2 I_s(e^{bV_a} - 1)$$

and for cases where the junction is biased well into the forward direction this reduces to $$I_0 \doteq \pi a^2 I_s e^{bV_a} \quad (8)$$

Substituting for $e^{bV_a}$ from Equation 6 gives $$I_0/I_a = Q/2 \quad (9)$$

and thus eliminating $I_a$ from Equations 7 and 9 we have $$I_r/I_0 = \frac{2}{Q}\left(\frac{a}{r}\right)^{Q-2} \quad (10)$$

also $$Q = \rho b I_a/2\pi = \left[\frac{\rho b I_0}{\pi}\right]^{1/2} \quad (11)$$

Note that $I_r$ is equal to the current that is emitted across the junction from $r$ to infinity. It is thus the current that could be collected by a concentric contact of inner radius $r$ and a large outer radius. Note also that $I_0$ is the current which flows directly across the p-type region into the contact of radius $a$. Thus, with reference to a stepping device Equation 10 gives the current that is emitted at radii greater than $r$ when a current $I_0$ is flowing in a contact of radius $a$.

Fig. 6 shows a plot obtained from Equation 10 of $$\frac{I_r}{I_0}$$

against $r/a$ with Q as parameter. For effective transfer in a stepping device $I_r$ must be greater than the turn-on current, $I_T$, as shown in Fig. 4, of an individual unit. The ratio $$\frac{I_r}{I_0}$$

then determines how much greater the operating current must be than the sustaining current in order to achieve transfer. Power considerations make it desirable to minimize the operating current, therefore, devices as presently fabricated should be restricted to values of $$\frac{I_r}{I_0}$$

greater than .01. A desirable value for this ratio is about 0.1. Fig. 6 shows that the transfer effect is greatest for the smallest values of $r/a$. The minimum value of $r/a$ which can be achieved is determined by practical considerations of size. Conveniently, $r-a$ can be 0.001 inch. A reasonable value for $a$ is about 0.01 inch. These considerations lead to values of $r/a$ of about 1.1. A desirable region of operation is thus confined within the enclosure shown dashed on Fig. 6. One typical set of operating parameters would be $$\frac{I_r}{I_0} \text{ equals } 0.1$$

$r/a$ equals 1.1, and $Q$ equals 10.

For counter applications it is often desirable to fabricate a structure embodying the above design principles with a closed array of stepping sections as shown in translator 70 of Fig. 7. A device of this configuration can be conveniently employed as a ring counter in accordance with known techniques. The circuit shown advances the conduction path two sections for each signal pulse applied, conduction transferring to the next adjacent section of the array while the pulse is imposed and advancing an additional section when the pulse is removed. This configuration is particularly advantageous in that both input and output are taken with respect to ground and thus the various portions of the translator are provided with relatively stable potentials.

The battery 71 and resistor 72 in combination with load resistors 73 and 74 establish a load line for the four region stepping sections 1 and 3 in the same manner as discussed above and shown in Fig. 3. After a conduction path has been initiated in section 1, current through load 73, which may be any convenient indicator such as a lamp or a voltage divider, develops a signal indicating the count is at the start or zero position. The individual values of loads 73 and 74 are small compared to common resistor 72 so that the drop across them when they are conducting is insufficient to develop the breakdown voltage $V_B$ of the remaining sections connected in parallel therewith. Thus, the voltages developed across the individual loads can be used as an indication of which section is conducting without impeding the lock-out feature of the circuit. Stepping sections 2 and 4 are connected to ground through a common resistor 75 of such magnitude that the load line it develops with resistor 72 and source 71 normally prevents these sections from going into a high current condition.

When an impulse poled to forward bias the outer junctions of a four zone section is applied through condenser 77 and lead 78 to sections 2 and 4, offering a voltage greater than the drop in 73 due to the current therein and providing a current greater than that flowing in conducting section 1, section 2 will go into the high current condition and section 1 will return to its low current state. This transfer to section 2 is assured since the diffusion of carriers into the common intermediate zone 80 and to the junction 96 between that zone and the individual intermediate zone 82 of section 2 has primed section 2 to a state requiring less voltage and current to switch it to its low impedance state. The flow in section 1 is extinguished by the flow of the impulse current through resistor 72 to reduce the potential across that section below the level, $V_S$, required to sustain its low impedance condition. Flow persists in section 2 until the end of the input pulse, at which time section 3 will enter the high current state since it is more favorably disposed to conduct than section 1 when the circuit returns to its steady state due to the priming action of the pulse current in section 2. This mode of operation can, of course, be extended to any number of contacts.

A four section counter has been fabricated as shown in Fig. 7 with four zones in each section as follows. A one-quarter inch square wafer was cut from a 10 ohm-centimeters p-type silicon single crystal grown on the 1:1:1 axis by slowly rotating the seed as it was pulled from a melt. The major wafer faces were polished and etched to reduce the thickness to about 2.5 mils and placed in an open tube diffusion furnace and held at about 1350° C. for one hour while antimony was diffused into the surface. The technique follows the vapor diffusion process set forth in the application of L. Derick and C. J. Frosch, Serial No. 550,622, filed December 2, 1955, and entitled "Oxidation of Semiconductive Surfaces for Controlled Diffusion." It involves heating antimony at 900° C. and passing nitrogen saturated with water vapor through the heating chamber and the furnace to pick up and carry antimony vapor across the heated silicon. The wafer was then cooled in the manner proposed in the applications of G. Bemski, Serial Nos. 559,258 and 559,259, both filed January 16, 1956, at 5° C. per minute to 750° C., annealed for 16 hours at 750° C., and then cooled at 5° C. per minute to 300° C. before removing it from the furnace in order to retain as much minority lifetime as possible.

The blank resulting from this procedure included an inner p-type layer two mils thick, which became intermediate zone 80 in the completed structure, coated with an n-type skin 25 mils thick, one face of which was outer zone 79 and the other face zones 81, 82, 83, and 84 in the translator 70, and an outer oxide film. The oxide was removed by dipping the wafer in hydrofluoric acid and metallic films were evaporated on the n-type skin. The wafer was mounted in a clean molybdenum jig (not shown) which had been outgassed at a few microns and prebaked for ten minutes at 60° C. at $2\times10^{-6}$ millimeters of mercury. Aluminum was evaporated to a depth of 0.1 mil at the four 20 mil squares forming zones 86, 87, 88, and 89 and electrodes 90, 91, 92, and 93 thereon. A 0.05 mil gold film containing 0.1 percent antimony was evaporated over the entire opposite face of the wafer to form contact 95. The blank was then alloyed at 700° C. in an atmosphere of hydrogen and cooled at a rate of less than 2° C. per minute for the first 300° C. The alloying step formed a gradual transition from metal through degenerate semiconductor to semiconductor on both wafer faces whereby low resistance ohmic contacts resulted. In addition, the silicon beneath the aluminum was converted to p conductivity type to a depth of about .02 mil to form zones 86, 87, 88, and 89, leaving .23 mil of n conductivity type material for zones 81, 82, 83, and 84.

The n layer from which zones 81, 82, 83, and 84 were derived was selectively masked with wax as a peripheral band on the wafer face. This band was then scribed with a tungsten point to form a two mil break therein at the separations between the four regions. An etchant of 25 parts of nitric acid and 15 parts of hydrofluoric acid, diluted to etch 0.09 mil per minute, was then applied to the masked face for about four minutes to separate the four zones 81, 82, 83, and 84.

Contact was made to the four alloyed aluminum dots 90, 91, 92, and 93 by using micromanipulator points, held thereon as pressure connections, and a piece of gold foil was employed as a contact to the gold alloyed region 95.

The unit fabricated as above exhibited a breakdown voltage for the stepping sections of about 50 volts and required turn-on currents $I_T$ of about two milliamperes and sustaining voltages of from one to two volts. When section 1 fired and passed 200 milliamperes, the saturation current of section 2 increased to two milliamperes. The application of about five volts to stage 2 placed it in its low impedance condition while stage 4 remained in the high impedance state.

A stepping device which decodes a three digit binary number is shown in Fig. 8. This device has a plurality of stepping sections, each of the same four zone configuration in the dimension of the paper as shown in Fig. 1. This stepping circuit is of the same form as that of Fig. 7, modified by the provision of a signal input circuit which discriminates between significant elements of the applied signal, for example, portions of different polarity, different magnitude, or different frequency and employs those significant elements to generate signals in selected circuits of a plurality of signal circuits feeding separate stepping sections or conduction paths in the translator. The translator is arranged so that alternative paths are available for every second bank of stepping sections and each of the signal applying circuits is associated with a section in the bank whereby the path of advancement through the array is chosen by selective sequential application of signals from the several sources.

Consider a binary number appearing as a pulse train as shown at PQ of Fig. 8 wherein a positive pulse 101 represents the presence of a digit and a negative pulse 102 represents the absence of a digit. When this signal is fed into a pulse forming circuit 103, which may be a pair of blocking oscillators, one of which develops a positive output pulse 105 for a positive input pulse 101 and no output for a negative inpulse pulse while the other produces a positive output pulse 106 for a negative input pulse 102 and no output for a positive input pulse, two pulses are available on two lines 110 and 111. One line, 110, is connected to one group of stepping sections and receives a pulse when a positive pulse is applied to the pulse forming circuit 103 and the other line 111 is connected to the group of alternative stepping sections and receives a pulse when a negative pulse is applied to circuit 103.

The stepping sections are arranged in pairs of banks, each pair representing a binary digit. The first bank contains starter or transfer sections and the second bank contains a pair of routing sections for each transfer section. One routing section of each pair is connected to the pulse line 110 and the other section of each pair is connected to the no-pulse line 111.

In operation the conducting, starting, or transfer section primes two routing sections, a "pulse" or "no-pulse" impulse is generating in pulse forming circuit 103 and imposed on the appropriate output line 110 or 111. Each of these circuits operates as discussed with regard to Fig. 7 so that an impulse is applied to all routing sections of the energized group. However, only the primed section conducts and its conduction occurs only during the duration of the impulse. When the impulse ceases the conduction path steps to the next adjacent transfer section to prime another pair of "pulse" and "no-pulse" routing sections.

In the illustration the number five is represented by the binary code shown at PQ. With starter section 114 conducting, sections 115 and 116 are primed. The first pulse 101 generates a pulse 105 in "pulse" lead 110 to transfer conduction to routing section 115. Conduction steps to transfer section 117 when pulse 105 ceases. "No-pulse" signal 102 generates a pulse 106 in "no-pulse" lead 111 to transfer conduction from section 117 to section 118 and thence to section 119 when that pulse ceases. Pulse 112 generates a corresponding pulse 113 in the "pulse" circuit to initiate conduction in section 120. The path steps to section 121 when the pulse terminates, causing current to flow in $R_5$ and thereby decoding the signal.

In the preceding discussions an initial state of conduction in one section has been assumed. In practice conduction can be initiated by any of a number of expedients. For example, the starter section A of Fig. 1, 1 of Fig. 7, or 114 of Fig. 8 can each be placed in the low impedance or conducting state by raising the level of charge carriers in the vicinity of the reverse biased inner junction sufficiently to reduce the effective number of recombination centers in the zones adjacent that junction and reduce its impedance, while a source providing a sustaining voltage and current is connected across the section. One means of doing this is to impose a voltage across the junction sufficient to initiate avalanche breakdown for a brief moment as by inserting a supplementing voltage in the lead individual to that section. This supplemental voltage is generated in circuit 103 of Fig. 8 and fed by lead 109 to section 114. Another technique is to generate carriers in the vicinity of that section by injecting carriers by means of a supplemental emitter adjacent the portion of the reverse biased junction within the starter section. All of these techniques require only a momentary operation which can be controlled by a suitable circuit of well known form.

Conduction or the low impedance state in the stepping devices can be terminated by breaking the circuit from source to the translator for an interval of sufficient length to permit the minority charge carriers in the regions bounding the reverse biased junction to decay below the level necessary to sustain the low impedance state. Once conduction is terminated the device can be reset as discussed above.

The preferred method of resetting the devices involves applying a large forward pulse to the starter section. A pulse of this nature steals the current from the conducting section by virtue of the drop in lock-out resistor 72 or 22 to return that section to its high impedance state, while placing the starter section in its low impedance state. Reset is assured if the pulse duration is sufficient to premit the charge carriers in the vicinity of the conducting section to decay below those induced by the pulse in the starter section.

It is to be understood that the above-described arrangements are illustrative of the application of the principles of the invention. Numerous other arrangements may be devised by those skilled in the art without departing from the spirit and scope of the invention.

What is claimed is:

1. A semiconductive device comprising a semiconductive body having a first zone of one conductivity type, a second zone of the opposite conductivity type forming a rectifying junction with said first zone, a first plurality of spaced zones, each of the one conductivity type and contiguous with a limited portion of the second zone for forming a separate rectifying junction with the second zone, and a second plurality of spaced zones, each of the opposite conductivity type and contiguous with a limited portion of a different one of the zones of the first plurality for forming a separate rectifying junction with said different one zone, each of said last-mentioned separate rectifying junctions being disposed opposite only one of said first-mentioned separate rectifying junctions and substantially opposite only one other of said first-mentioned separate rectifying junctions, an electrical connection to said first zone, and a separate electrical connection to each of the zones of said second plurality.

2. A counting arrangement comprising a semiconductive device in accordance with claim 1 and means including voltage supply means connected between the electrical connection to the first zone and the individual electrical connections to each of the zones of the second plurality for causing significant current flow through only one pair of opposite separate rectifying junctions at a given time.

3. A semiconductive device comprising a semiconductive body having first and second zones of opposite conductivity type for defining a first rectifying junction, a first plurality of zones, each contiguous to the second zone and of opposite conductivity type thereto for defining a first plurality of individual rectifying junctions, a second plurality of zones, each contiguous to a different zone of said first plurality of zones and of opposite conductivity type thereto for defining a second plurality of individual rectifying junctions, the rectifying junctions of said second plurality being disposed asymmetrically with respect to the rectifying junctions of said first plurality, whereby the density of current flow across the rectifying junction of each of said first plurality tends to vary along the length of said rectifying junction, an electrical connection to the first zone, and an individual electrical connection to each of the zones of said second plurality.

4. A counting device comprising a semiconductive device in accordance with claim 3 and means including voltage supply means connected between the electrical connection to the first zone and the individual electrical connections to the zones of said second plurality for causing appreciable current to flow in turn through the individual electrical connections.

5. A semiconductive device comprising a semiconductive body including a plurality of individual conductive paths therethrough, each consisting of four contiguous zones in succession, successive zones being of the opposite conductivity type, each of the conductive paths having common first and second zones and individual third and fourth zones, an electrical connection to the common first zone forming a common connection to the individual conductive paths, and an individual electrical connection to each of the individual fourth zones for connecting separately to each of the individual conductive paths.

6. A semiconductive device according to claim 5 in which the individual third and fourth zones of each individual conductive path are asymmetrically disposed with respect to one another.

7. A counting arrangement including a semiconductive device according to claim 6 and means including voltage supply means connected between the common electrical connection and the individual electron connections for switching individual conductive paths from a high impedance state to a low impedance state under the control of counting information.

8. A semiconductive device according to claim 5 in which the fourth zone in each individual conductive path is contiguous to only a limited end portion of the third zone of its individual conductive path.

References Cited in the file of this patent

UNITED STATES PATENTS

| | | |
|---|---|---|
| 2,655,607 | Reeves | Oct. 13, 1953 |
| 2,655,610 | Ebers | Oct. 13, 1953 |
| 2,689,930 | Hall | Sept. 21, 1954 |
| 2,770,740 | Reeves et al. | Nov. 13, 1956 |